United States Patent
Stark

[15] 3,649,063
[45] Mar. 14, 1972

[54] CAMPING SHELTER EMPLOYING CAMPER SHELL AS TOP PORTION

[72] Inventor: Turner Stark, 534 Guava Avenue, Chula Vista, Calif. 92010

[22] Filed: June 29, 1970

[21] Appl. No.: 50,588

[52] U.S. Cl............................................296/23 R, 135/1 A
[51] Int. Cl.................................................B60p 3/32
[58] Field of Search................296/23, 23 MC; 135/1 A, 3 A, 135/4 A, 5 A

[56] References Cited

UNITED STATES PATENTS 3,111,955  11/1963  Green.....................................135/1 A Primary Examiner—Philip Goodman
Attorney—Thomas D. Lane

[57] ABSTRACT

A plurality of support legs are removably connected to a camper shell mounted on a pickup truck. The legs are slightly longer than the distance from the camper shell to the ground, and are shaped to permit the truck to be driven from beneath the camper shell when the latter is supported on the legs. A canvas wall enclosure in the nature of an open top tent has its otherwise open upper end releasably attached co-extensively to the sides and ends of the leg-supported camper shell. The lower end of the wall enclosure is somewhat larger than its upper end, and is pegged in outstretched condition to the ground so that the combined camper shell and enclosure form a camping shelter.

6 Claims, 4 Drawing Figures

Patented March 14, 1972

INVENTOR.
TURNER STARK

Patented March 14, 1972

INVENTOR.
TURNER STARK 3,649,063

CAMPING SHELTER EMPLOYING CAMPER SHELL AS TOP PORTION

BACKGROUND OF THE INVENTION

In recent years the use of so called "campers" and "camper shells" on pickup trucks has increased greatly. A "camper" is a box like housing with integral floor, somewhat in the nature of the body of a camping trailer which fits into the bed of a pickup truck, and usually is large enough for one to stand erect in. A camper usually is equipped with bunks, butane cooking stove and lamps, and sometimes a refrigerator. Such "campers" usually have no other use than for camping, and, due to their large size and lateral exposure are subject to difficulties and sometimes danger from overhead obstructions and cross winds.

A "camper shell" on the other hand is in the nature of a rigid or semi-rigid cover or shell which fits over the bed of a pickup truck, with the sides and ends of the camper shell resting on, and co-extensive with the sides and ends of the truck body. "Camper shells" are usually left on the truck more or less permanently, since they do not noticeably interfere with driving, shelter their contents from the weather, and can be locked up. On the other hand, when used for camping, they are small, do not have full headroom, and at best provide rather Spartan camping facilities.

SUMMARY OF THE INVENTION

A primary objective of the present invention is to provide an improved camping shelter by combining a camper shell with supporting legs and a co-extensive canvas enclosure which provides walls downwardly co-extensive with the side and end walls of the camper shell.

A further objective is to support a camper shell released from a pickup truck in slightly raised relation to the truck body so as to permit the truck to be driven out from under the camper shell, and then to provide a truncated pyramidal canvas or canvas-like enclosure which is fastened co-extensively onto the bottom edges of the camper shell and extends thence to the ground, where it is pegged out to form, with the camper shell, a rigid-top shelter.

BRIEF DESCRIPTION OF THE DRAWINGS

The foregoing objectives and advantages of the invention will be apparent from the following description and the accompanying drawings, wherein.

DETAILED DESCRIPTION

Figure 4:
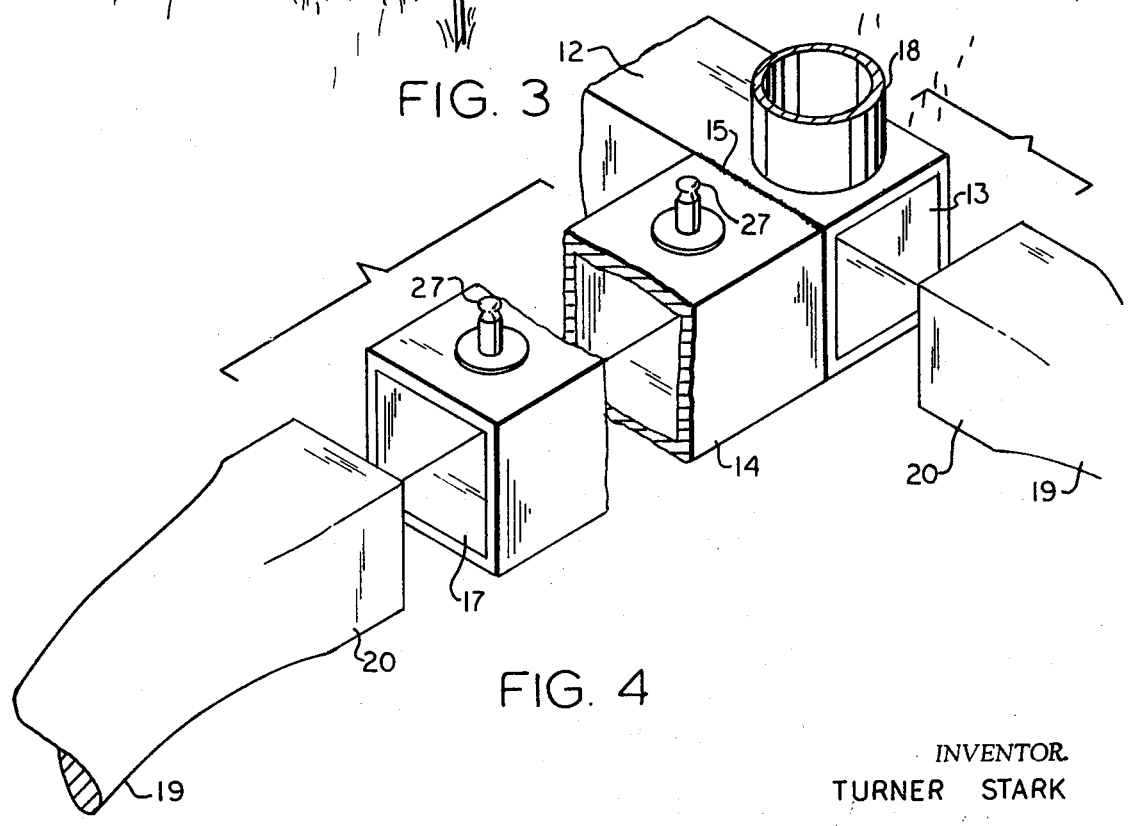
FIG. 4 is an enlarged, fragmentary, perspective view showing portions of the bottom frame of an illustrative soft top camper shell and two of the support legs ready for connection to the frame.

Referring to the drawings in detail, an illustrative embodiment of the invention comprises a camper shell A having a rigid, rectangular, horizontal U-shape bottom frame 10 constructed of square steel tubular members welded together at the corners as best shown in FIG. 4, and a covering 11 of canvas or canvas-like material.

The camper shell frame 10 comprises a square, metal, tubular, transverse front member 12 with the open ends thereof exposed to provide leg receiving sockets as at 13, FIG. 4, and side members 14 of similar material welded to the front frame member 12 as at 15, FIG. 4 with their open rear ends exposed as at 17 in FIG. 4.

Five identical, inverted, U-shape bows 18 extend from one frame side member 14 to the other, these bows preferably being of steel tubing welded to the frame 10 as shown in FIG. 4.

As is well known there are many different types of camper shells in addition to that A shown in the drawings, most of them being rigid and made of various materials such as metal, wood, fiberglass, plastic, etc. Regardless of the specific type of camper shell involved, some suitable, releasable, leg fastening means is provided for connecting a plurality of support legs to the camper shell. The specific leg mounting means employed is not a feature of the present invention, and obviously will vary with the type of camper shell for which it is intended. Suitable leg mounting means can readily be devised by an ordinarily skilled designer or mechanic for each of the various types of camper shells for which they are required.

Figure 1:
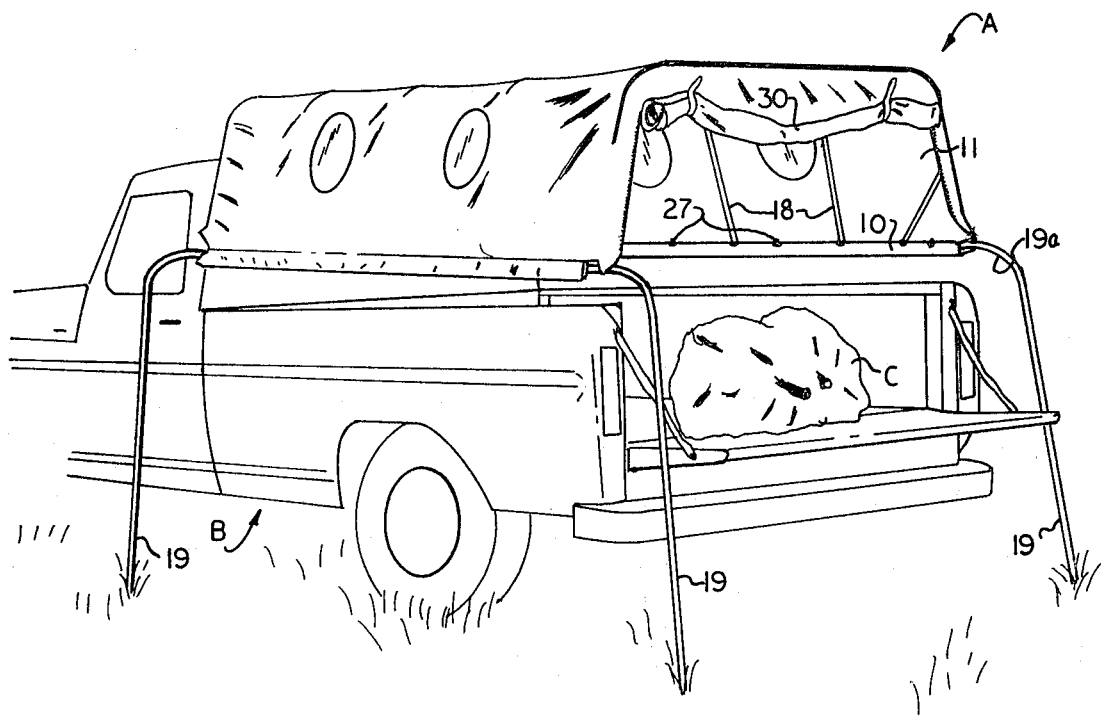
FIG. 1 is a perspective view showing the camper shell released from the pickup truck and supported on the legs.
Figure 2:
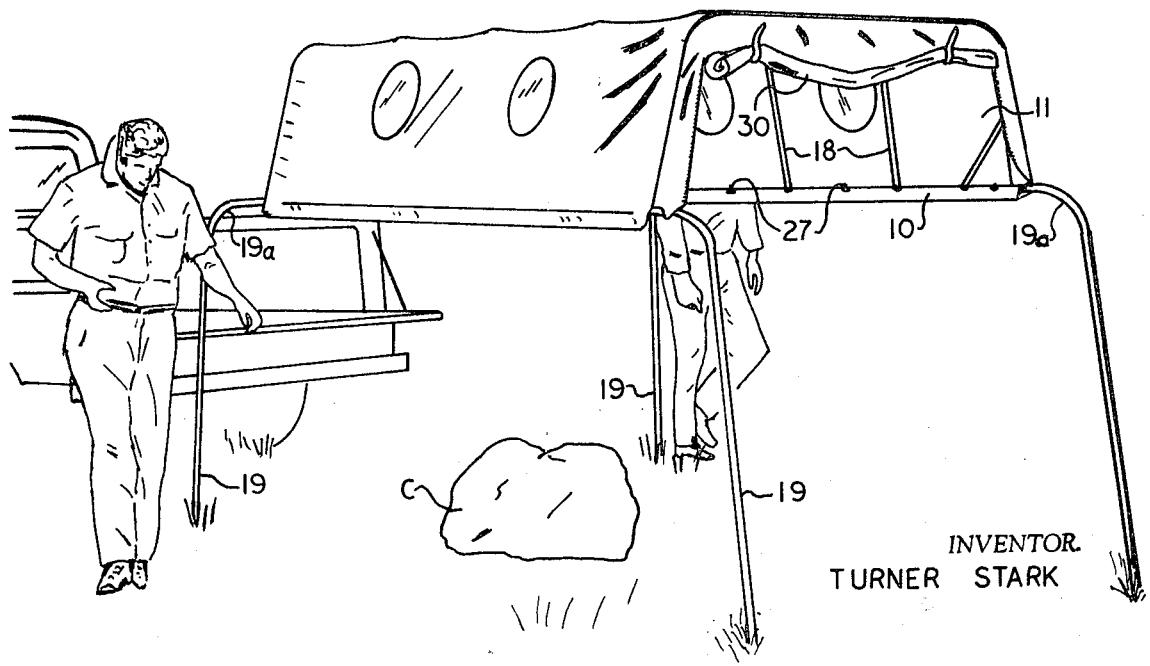
FIG. 2 shows the truck driven from beneath the leg supported camper shell leaving the latter ready for the erection of the sidewall enclosure.

In the illustrative form of the invention, four identical support legs 19 are provided, each leg having a curved upper end portion 19a terminating in a square plug 20 of a size to fit snugly and non-rotatively, but releasably, one into each of the four frame sockets such as those shown at 13 and 17 in FIG. 4. The legs 19 are each of a length slightly greater than the distance from the camper shell frame 10 to the ground when the camper shell is mounted on a pickup truck B, so that when inserting the plug ends 20 of the legs 19 into their respective sockets it is necessary to raise the camper shell A slightly, for example a few inches, from the body of the pickup truck B upon which it is mounted. When the camper shell A is mounted on the legs 19 as shown in FIG. 1, the truck B is driven out from beneath the camper shell, leaving the latter standing free and clear as shown in FIG. 2.

A wall enclosure C for enclosing the space beneath the leg-supported camper shell A is of suitable canvas or canvas-like material, and comprises four side walls 21, 22, 23 and 24. These walls slope outwardly toward their lower ends in the nature of a truncated pyramid, which braces the structure against lateral forces such as wind load. A canvas floor 25, in the nature of a usual tent floor, is sewn into the bottom of the wall enclosure C. The enclosure walls 21, 22, 23 and 24 are of a length to extend from suitable fastening means 27, such as conventional snap fasteners, provided on the camper shell A to the ground.

Figure 3:
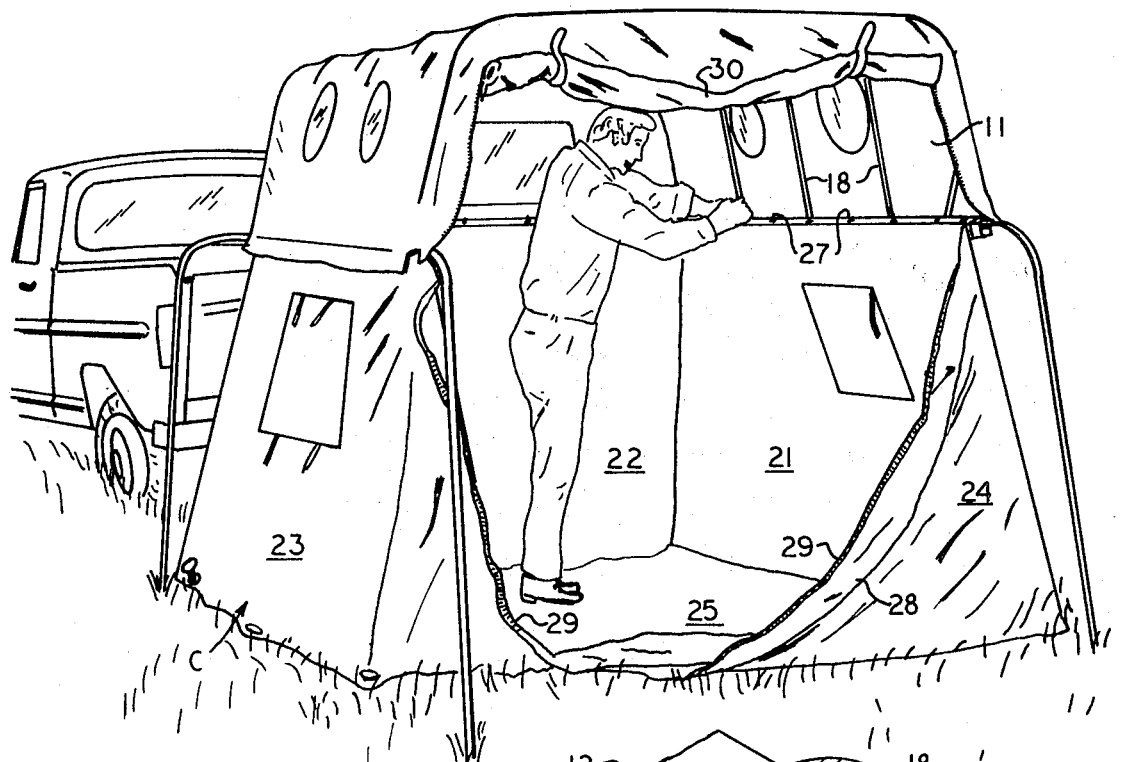
FIG. 3 shows the sidewall enclosure assembled with the camper shell and ready for pegging down the stretched out lower edges of the enclosure.

A suitable or conventional door opening or flap 28, see FIG. 4, is provided, preferably in the rear enclosure wall 24, and may be closed in any suitable manner, for example by means of a conventional zipper 29, see FIG. 3. Many suitable types of tent and other closures and doors are well known, and since the door closure is not per se a feature of the invention, the details thereof are not illustrated.

OPERATION

For erecting the combination camping shelter AC shown in FIG. 3, a truck B, with camper shell A mounted thereon is driven onto a selected campsite as shown in FIG. 1, and usual camper shell hold-down means, not shown, which secure the camper shell to the pickup truck, are released to free the camper shell from the truck.

The legs 19 are then attached, one preferably to each corner of the camper shell A, which operation, as mentioned previously herein, requires raising the camper shell A slightly from its position on the truck B in the manner shown in FIG. 1.

The pickup truck B is then driven forward from beneath of the camper shell A as shown in FIG. 2, and the wall enclosure C, which preferably is either bagged or rolled up in the pickup truck while traveling, is placed on the ground beneath the leg-supported camper shell as shown in FIG. 2. The wall enclosure C is then opened up, and the upper edges of the side walls 21, 22, 23 and 24 are lifted up and attached, as by means of the fasteners 27, FIG. 4, co-extensively to the lower edges of the sides and ends of the camper shell A. As shown, the camper shell rear curtain 30 will be rolled down before fastening the rear closure wall 24 thereto.

The assembly of camper shell A and wall enclosure C, which at this stage is shown in FIG. 3, is then completed by fastening the rear enclosure wall 24 to the rear camper shell curtain 30, stretching the floor 25 taut, and pegging the lower edges of the wall down to tauten the side walls and floor.

For striking the shelter AC the foregoing procedure for erecting the shelter is reversed.

The invention provides a strong, rigid-top, weather resistant, low cost camping shelter in the nature of a full headroom tent, which is easily erected and removed, and which does not obstruct or restrict the use of the camper shell for other purposes when not in use.

Having thus described my invention, what I claim as new and useful and desire to secure by U.S. Letters Patent is:

1. A camping shelter comprising, in combination,
   a camper shell, having an open bottom,
   a plurality of support legs removably connected in supporting relation to the camper shell, the legs being of a length to support the camper shell in slightly raised condition from a pickup truck on which the camper shell is adapted to be mounted,
   a wall enclosure of canvas-like material comprising four walls in the nature of a rectangular open top tent, with the open top thereof fitted to the open bottom of the camper shell, and extending thence to the ground,
   fastening means releasably fastening the fitted open top of the wall enclosure to the open bottom of the camper shell, and
   means attaching the outstretched lower edges of the wall enclosure to the ground.

2. A camping shelter as claimed in claim 1 wherein a leg mounting socket is provided on each corner of the camper shell, and the upper end of each leg is shaped to fit firmly into one of the sockets.

3. A camping shelter as claimed in claim 2 wherein each socket and the portion of each leg shaped to fit therein are non-circular so that the leg is secured against rotative movement when fitted into one of the sockets.

4. A camping structure as claimed in claim 3 wherein two of the sockets extend laterally, one from each forward corner of the camper shell, and two of the sockets extend rearwardly, one from each rear corner of the camper shell, and the upper portion of each leg is bent to define an angle of the order of a right angle.

5. A camping shelter as claimed in claim 1 wherein the wall enclosure is in the form of a truncated pyramid whereby the sloping walls thereof provide diagonal bracing support for resisting lateral forces exerted on the shelter.

6. A camping shelter as claimed in claim 4 wherein a canvas-like floor is sewed into the bottom of the wall enclosure.

* * * * *